Figure 1:
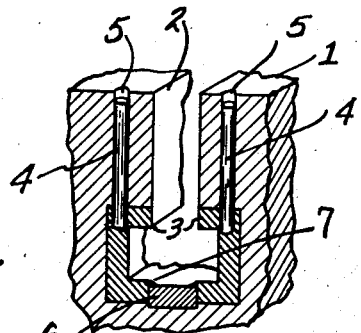

Jan. 1, 1935.  R. H. McCLELLAN ET AL  1,986,006
MACHINE TOOL CONSTRUCTION
Filed Oct. 19, 1931

INVENTORS.
Raymond H. McClellan
John Langley
William B. Quilton
BY
ATTORNEYS.

Patented Jan. 1, 1935

1,986,006

UNITED STATES PATENT OFFICE 1,986,006

MACHINE TOOL CONSTRUCTION

Raymond H. McClellan, Hamilton, and George Langen and Bertram B. Quillen, Cincinnati, Ohio, assignors to The Cincinnati Planer Company, Cincinnati, Ohio, a corporation of Ohio Application October 19, 1931, Serial No. 569,682

4 Claims. (Cl. 90—58)

Our invention relates to improvements in machine tool construction, and particularly to improvements in T-slot construction in machine tool work tables.

It is well known to the users and builders of machine tools in which work tables are provided with T-slots, through which bolts are extended, which clamps the work on the table, that the strain of the bolts or work clamps often causes the T-slots to break out. The work tables of most machine tools are of cast iron, which does not have sufficient strength to resist the localized strain on the inner sharp corners of the T-slots, and when a severe strain arises, the entire lip of metal within the T-slot becomes ruptured.

A breaking out of T-slots is a very serious disadvantage to work table construction, as it requires the replacing of the entire table.

It is the object of our invention to provide a T-slot construction in which the portions of the T-slot which are under the greatest strain, are constructed so as to resist the tendency to break out.

It is further an object of our invention to provide a T-slot construction so constructed and arranged that when the inner edges of the T-slot do break out, it is a simple matter to replace the wear portions, so that the entire table does not have to be discarded.

Specifically it is the object of our invention to line the T-slot in the cast iron tables of machine tools with replaceable steel strips at the points of greatest strain, thus providing a stronger metal that will not crack, and also distributing the strain over a large area. This construction enables a considerable saving in maintenance expense to the user of the machine tool.

The above objects and other objects to which reference will be made in the ensuing disclosure, we accomplish by that certain combination and arrangement of parts of which we have shown several preferred modifications.

Referring to the drawing:—

Figures 1 to 7 represent respective views showing different modifications in construction, all of which employ the principle of this invention.

Referring first to Fig. 1, we have shown a portion of the work table 1 provided with a T-slot made in accordance with the standard construction with entrance 2 through the top of the table 1.

Underneath the ledge of the slot we have shown steel strips in the form of channels 3 held in position by drive pins 4, which extend down through openings 5 in the table. Between the lower legs of the channel, we have shown a steel plate 6 welded as at 7 to securely retain the channels within the T-slot.

Figure 2:
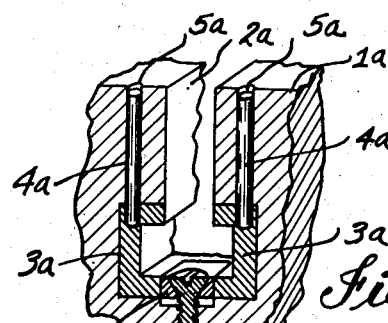

In Fig. 2, we have shown a portion of the table 1a, provided with a T-slot having entrance 2a. Strips in the form of channels 3a are placed within the slots, as indicated, and are secured in position by drive pins 4a, which pass down through openings 5a. A steel plate 6a is positioned between the lower legs of the channels and held in position by closely spaced screws 7a.

Figure 3:
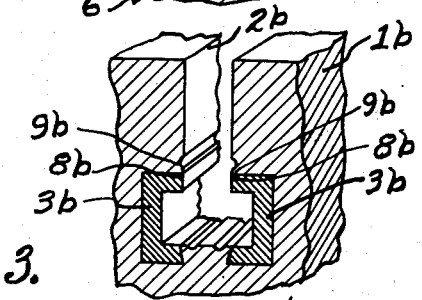

In Fig. 3 we have shown the table 1B, having a T-slot having entrance 2B. Strips in the form of channels 3B are placed within the slots, and are retained within the slots by cold flowing the metal of the table over angularly formed edges 8B of the channels, as indicated at 9B.

Figure 4:
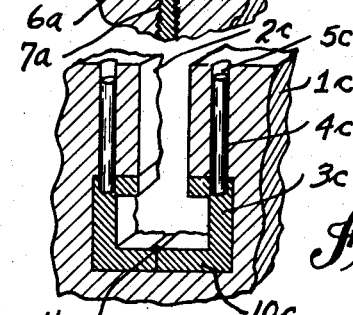
Figure 5:
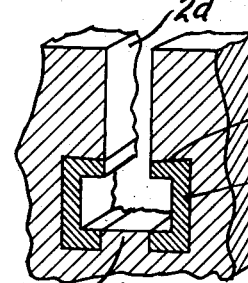

In Fig. 4 we have shown the table 1C, having a T-slot having entrance 2C. Strips in the form of channels 3C have lower legs 10C, which are longer than the upper legs. Drive pins 4C extend down through openings 5C, and the pins are driven into the upper legs of the channels. The juncture of the longer lower legs is welded together, as indicated at 11C. In Fig. 5, the table 1D is provided with the slots 2D and U-shaped channels 3D, having legs of equal length, but with the upper surface of the upper legs inclined downwardly as indicated at 12D. The widened part of the T-slot above the channels 3D is inclined downwardly, as indicated, to interlock with the angled upper surface of the channels. A buttress 13D bears against the ends of the lower ledge, thereby holding the channels in position.

Figure 6:
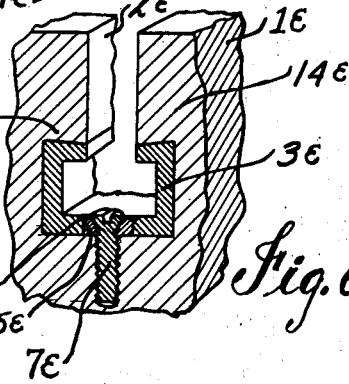

In Fig. 6 we have shown the machine tool table 1E, having a T-slot with entrance 2E. Two strips in the form of channels 3E have upper legs inclined as indicated at 14E, and the cast metal which engages the inclined upper surfaces of the legs is inclined downwardly in a corresponding manner. The channels are held in place by a strip 15E, and the strip is held in place by closely spaced screws 7E. The strip 15E and the lower legs of the channels may be welded together, as indicated at 16, and the juncture occupied by the weld is preferably afterward rolled to insure the tightness of the joint.

Figure 7:
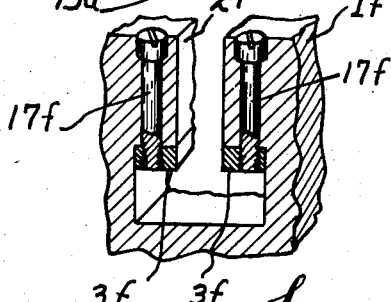

In Fig. 7 we have shown the table 1F, having a T-slot with entrance 2F, and having the steel strips 3F flat and not channel shaped secured in position by a series of closely spaced screws 17F. The closely spaced screws may be inserted from the top of the table.

In any example, the parts that function as the reinforcement are those under the portions of the T-slots upon which the greatest strain is exerted, which are the inner corner edges at the entrance, and it is these corner edges which, in the usual cast iron table construction, become chipped off and broken. Where channel-shaped strips are used, the lower portions thereof serve, with the means at the bottom of the T-slot, as the means for holding the strips in the slot.

Having thus described our invention, what we claim as new and desire to secure by Letters Patent, is:—

1. In combination with the work table of a machine tool having a T-slot therein for retaining work holding clamps, means for reinforcing the inner corner edges of the T-slot comprising channel members having their upper legs secured within the slot, and with buttress strips uniting the outer edges of the lower legs of the channels.

2. In combination with the work table of a machine tool having a T-slot therein for retaining work holding clamps, means for reinforcing the inner corner edges of the T-slot comprising channel members having their upper legs secured within the slot, and with buttress strips uniting the outer edges of the lower legs of the channels, said means for retaining the upper legs of the channels comprising drive pins inserted through openings in said table.

3. In combination with the work table of a machine tool having a T-slot therein for retaining work holding clamps, means for reinforcing the inner corner edges of the T-slot comprising channel members having their upper legs secured within the slot, and with buttress strips uniting the outer edges of the lower legs of the channels, said means for retaining the upper legs of the channels comprising drive pins inserted through openings in said table, said buttress strips being secured to the table.

4. In combination with the work table of a machine tool having a T-slot for retaining work clamps, means for reinforcing the inner corner edges of the slot comprising channels of stronger metal than that of which the table is constructed, said channels having upper legs having downwardly inclined upper surfaces, with the metal of the table conforming to the downwardly inclined upper surfaces of the upper legs of the channels, and means for securing the lower legs of the channel together comprising buttress strips.

RAYMOND H. McCLELLAN.
GEORGE LANGEN.
BERTRAM B. QUILLEN.